United States Patent Office 3,213,281
Patented Oct. 19, 1965

3,213,281
INHOMOGENEOUS MAGNETIC FIELD CONTROLLED LASER DEVICE
Howard C. Nedderman, Pittsford, N.Y., assignor to General Dynamics Corporation, Rochester, N.Y., a corporation of Delaware
Filed May 24, 1962, Ser. No. 197,474
11 Claims. (Cl. 250—199)

This invention relates to laser devices and, more particularly, to a laser device producing oscillations which are controlled by an applied inhomogeneous magnetic field.

As is well known in a laser device, a large population of atoms of a laser element, in response to illumination by a pump light source, is raised from a ground energy level to a particular excited energy level which depends on the material of which the laser element is composed. In the absence of an external electromagnetic wave of the proper frequency, the probability that an excited atom will fall from its excited energy level back to its ground energy level is extremely small. However, when an excited atom is stimulated by an external electromagnetic wave having a frequency corresponding to the difference between the excited and ground energy levels, the probability that the atom will fall back to its ground energy level is greatly enhanced. In falling back to its ground energy level, the atom emits a photon having a frequency corresponding to the difference between its excited and ground energy levels, thereby increasing the intensity of the external electromagnetic wave.

It will be seen, therefore, that as an electromagnetic wave passes through a laser element, it will stimulate some of the excited atoms to fall back to their ground energy level, causing an increase in the magnitude of the electromagnetic wave. Thus, gain will take place in the electromagnetic wave in passing through the laser element.

Furthermore, by reflection, at least a portion of the electromagnetic wave may be passed repeatedly through the laser element. If the gain per pass is maintained greater than the inherent losses which take place, and the laser element is dimensioned to provide the proper phase relationship between the original and reflected waves, coherent oscillations will take place at the transition frequency corresponding to the difference between the ground energy levels of the excited atoms.

From the foregoing it will be seen that no oscillations will take place unless the gain is greater than the loss per pass of the electromagnetic wave through the laser element, and that the intensity of the electromagnetic wave is dependent on the ratio of the gain with respect to the losses which take place per pass of the electromagnetic wave through the laser element. Furthermore, the gain which takes place per pass of the electromagnetic wave through the laser element depends both on the size of the population of excited atoms and the probability of interaction between each of the excited atoms and the electromagnetic wave.

In the past, it has been the practice to control both the onset of laser oscillation and/or the amplitude of laser oscillation by controlling the loss, rather than the gain, which takes place. This is known as "Q" spoiling. It will be seen that "Q" spoiling techniques have the disadvantage of reducing the efficiency of the laser device. In addition, at least in some "Q" spoiling methods, it is necessary to pass the laser output beam through additional optical elements.

In the present invention, the onset of laser oscillation and/or the amplitude of the laser oscillation produced, is regulated by controlling the gain, rather than the loss, which takes place during each pass of the electromagnetic wave through the laser element. This is accomplished by applying a magnetic field within the laser elements sufficient to cause Zeeman splitting of the particular excited energy level which, as discussed above, determines laser operation. Any magnetic field, whether homogeneous or inhomogeneous, which causes Zeeman splittng will result in reducing the active center of atom population density per frequency interval and thereby lower the probability of interaction between an electromagnetic wave of a given frequency with the split energy levels of the excited atoms. Therefore, gain will be reduced. However, an inhomogeneous magnetic field is much more effective for this purpose than a homogeneous magnetic field, since the frequency separation of the split levels of the excited atoms in different portions of the laser element vary from each other. Therefore, the lowering of probability of interaction by a total magnetic field of given magnitude is much greater if this magnetic field is inhomogeneously disposed within the laser element, rather than homogeneously disposed therein.

Furthermore, if the magnitude of the magnetic field is sufficient to cause maximum Zeeman splitting comparable to or larger than the natural line width of the laser transition level, the probability of interaction will be lowered so much that no gain will take place, thereby causing laser oscillations to be blocked. This blocking will continue, independent of the power of the pump light source, until the magnetic field is removed because there is insufficient gain at any given frequency to achieve oscillation. However, the continued illumination of the laser element by the pump light source during this blocking period will cause the population of excited atoms to become much larger than is possible when the laser element is unblocked so that stimulated emission of the excited atoms can take place. Therefore, should the magnetic field suddenly be removed, a burst of oscillation will be produced which has a much higher peak intensity than the oscillations produced without a magnetic field because the integrated absorption of pump light during the magnetic field blanking contributes to increasing the population inversion available for oscillation when the field is removed.

It will further be seen that by utilizing a magnetic field having an average magnitude insufficient to cause blocking, and then modulating the magnitude of this magnetic field with an analog signal, an amplitude modulated laser beam may be produced.

It is, therefore, an object of this invention to provide control of laser oscillation by a magnetic field.

It is a further object of this invention to provide control of laser oscillation by an inhomogeneous magnetic field.

It is a further object of this invention to provide pulses of laser oscillation having increased peak intensity.

It is a further object of this invention to provide amplitude modulated laser oscillation.

These and other objects, features, and advantages of the present invention will become more apparent from the following detailed description taken together with the accompanying drawings in which.

Figure 1:
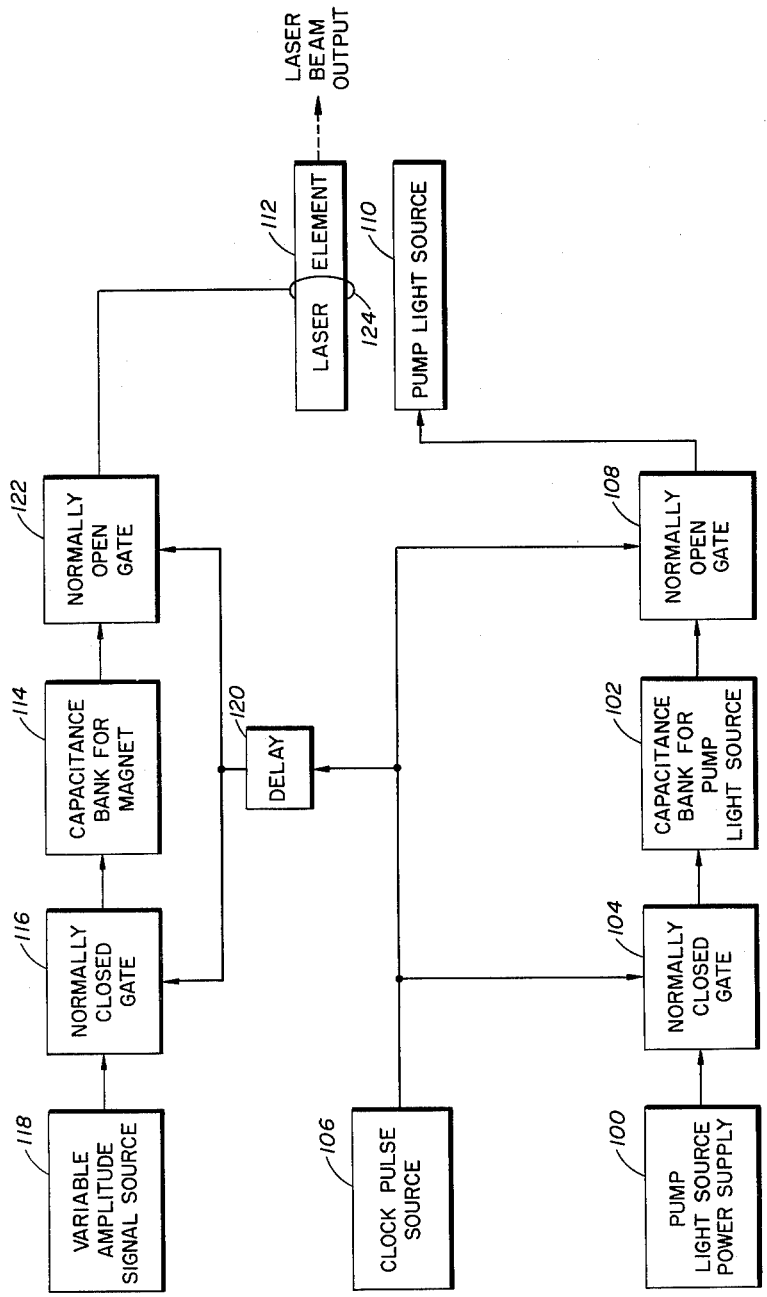
FIG. 1 is a block diagram of a preferred embodiment of the invention.

Referring now to FIG. 1, there is shown pump light source power supply 100 which charges the capacitance bank for pump light source 102 through normally closed gate 104. At intervals, when capacitance bank 102 is fully charged, clock pulse source 106 applies a pulse to both normally closed gate 104, thereby opening closed gate 104, and to normally open gate 108, thereby closing gate 108. In response to the closing of normally open gate 108, capacitance bank 102 discharges through pump light source 110, which comprises a flash tube.

Laser element 112 is located in cooperative relationship with pump light source 110 so that, in response to the energization of pump light source 110, laser element 112 is illuminated thereby. In response to being illuminated by pump light source 110, the atoms of laser element 112 are raised to an excited energy level, as is well known in the art.

Capacitance bank for magnet 114 is charged through normally closed gate 116 to a value determined by the amplitude of the signal from variable amplitude signal source 118 which then exists. A pulse from clock pulse source 106, in addition to being applied to gates 104 and 108 as described above, is also applied through a relatively short time delay circuit 120 to both normally close gate 116, causing gate 116 to open, and normally open gate 122, causing gate 122 to close. In response to the closing of normally open gate 122, capacitance bank 114 very quickly discharges through coil 124 which surrounds the middle of laser element 112.

Coil 124, in response to the discharge current from capacitance bank 114 flowing therethrough, forms an electromagnet which provides a magnetic field having an inhomogeneous component parallel to the axis of laser element 112.

The delay produced by delay circuit 120 provides sufficient time for pump light source 110 to raise a sufficient number of atoms of laser element 112 to an excited energy level so that laser element 112 is nearly on the verge of oscillating when capacitance bank 114 is discharged through coil 124.

If capacitance bank 114 has been charged to a sufficiently high potential by variable amplitude signal source 118, the discharge current from capacitance bank 114 flowing in coil 124 will be sufficient to block the laser oscillations which would take place except therefor. This, as has been described above, permits the pump light source 110 to further increase the population of excited atoms in laser element 112. Therefore, following the discharge of capacitance bank 114 through coil 124, when the magnetic field has terminated, laser element 112 will emit a short burst of oscillations having a peak intensity higher than would otherwise be obtainable.

If the signal from variable amplitude signal source 118 varies in accordance with an analog signal, so that the charge applied to capacitance bank 114 has a value which corresponds to the instantaneous value of the analog signal, and the absolute magnitude of the charge is maintained insufficient to cause blocking of laser element 112 when capacitance bank 114 is discharged through coil 124, the laser beam output from laser element 112 will consist of amplitude modulated pulses of laser oscillations. The envelope of these amplitude modulated pulses of oscillations will vary in accordance with the analog signal.

Figure 2:
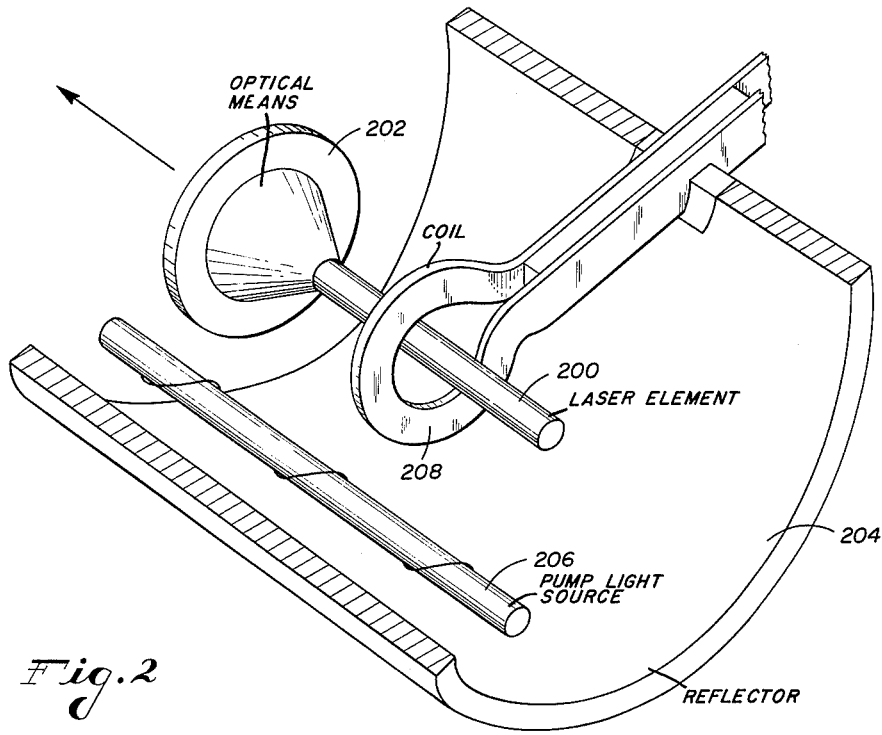
FIG. 2 is a diagrammatic showing of a solid state laser element together with a pump light source, reflector therefor, and magnetic means for providing an inhomogeneous magnetic field within the laser element.

Referring now to FIG. 2, there is shown a sapphire-clad ruby laser element 200 having output optical means 202 attached to one end thereof. Laser element 200 is located along the axis of cylindrical reflector 204. A linear pump light source flash tube 206 is located such that the light emitted therefrom when it is flashed is focused by reflector 204 on laser element 200. An inhomogeneous axial field is produced within laser element 200 by coil 208 surrounding the central region of laser element 200, as shown. Coil 208 is, of course, provided with very high current in response to the discharge of a capacitance bank, not shown.

Figure 3:
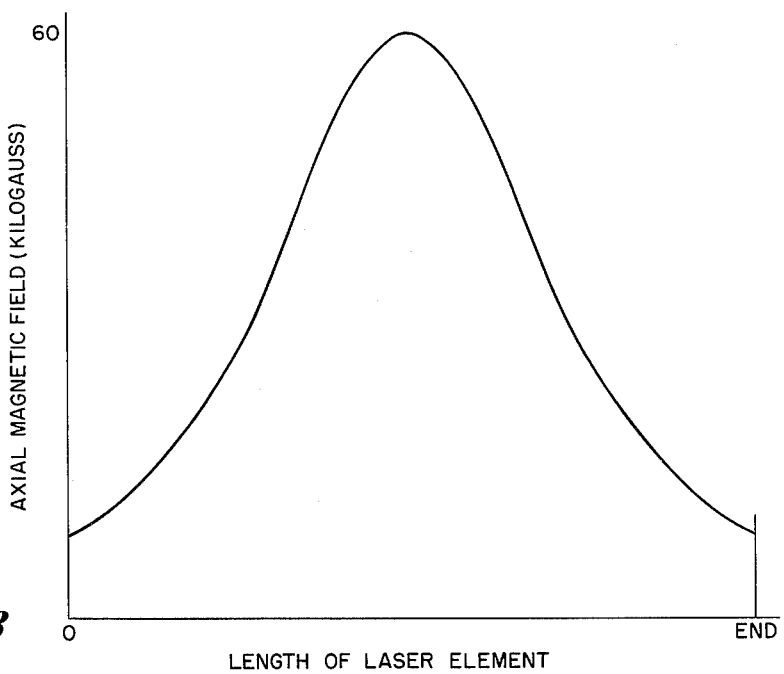
FIG. 3 is a graph showing the intensity of the magnitude of the axial magnetic field as a function of the length of the laser element.

The manner in which the magnitude of the axial magnetic field within laser element 200 varies over the length thereof is shown in FIG. 3.

Although the present invention has been described in connection with a flashing pump light source, it should be understood that a continuous pump light source could be utilized and that the magnetic field may be produced in other ways well known in the art. Therefore, it is not intended that this invention be restricted to the preferred embodiment disclosed in detail herein, but that it be only limited by the true scope and spirit of the appended claims.

What is claimed is:
1. Laser apparatus comprising
   (a) a laser medium having a given length,
   (b) means for exciting said medium for the emission of coherent electromagnetic waves from said medium, and
   (c) means for establishing within said medium an inhomogeneous magnetic field continuously varying in strength throughout said medium whereby to control the emission of said waves.
2. Laser amplifier apparatus comprising
   (a) a laser medium having a longitudinal axis,
   (b) means for applying to said medium an electromagnetic wave to be amplified,
   (c) means for exciting said medium for the emission of coherent electromagnetic waves of the frequency of said wave to be amplified, and
   (d) means for establishing within said medium an inhomogeneous magnetic field continuously varying in strength throughout said medium whereby to control the amount of amplification of said wave.
3. Laser apparatus comprising
   (a) lasser element having a longitudinal axis,
   (b) means for exciting said element for the emission of coherent electromagnetic waves,
   (c) a source of current pulses, and
   (d) means responsive to said current pulses for establishing an inhomogeneous magnetic field within said element which varies along said longitudinal axis of said element in flux density whereby to control the emission of said waves.
4. Laser apparatus comprising
   (a) a laser element of rod-like shape,
   (b) means for pumping energy into said element for stimulating the emission from said element, in a direction axially thereof, of coherent electromagnetic waves,
   (c) a single turn coil around said element which provides an inhomogeneous magnetic field with respect to the axis of said element, the axis of said coil being approximately parallel to the axis of said element, and
   (d) means for energizing said coil for establishing a magnetic field in said element.
5. A laser device comprising
   (a) a laser element,
   (b) a pump light source in co-operative relationship with said element for illuminating said element when energized,
   (c) means for applying power to said source for energizing said source, and
   (b) means for establishing an inhomogeneous magnetic field which continuously varies in strength within and throughout said laser element.
6. The invention as set forth in claim 5 including means coupled to said field establishing means for varying the intensity of said magnetic field within said laser element.
7. Signal translating apparatus comprising
   (a) a laser medium having a given length,
   (b) means operative for exciting said medium to obtain the emission of a beam of coherent radiation of certain intensity therefrom,
   (c) a source of pulse signals, and
   (d) means responsive to said signals for establishing bursts of a magnetic field which is inhomogeneous with respect to the length of said medium for increasing and decreasing the intensity of said beam with respect to said certain intensity.

8. Signal translating apparatus comprising
   (a) a laser element,
   (b) pump means for exciting said element to emit a beam of coherent radiation of certain intensity,
   (c) means for intermittently establishing a magnetic field within said element during excitation thereof by said pump means for increasing and decreasing the intensity of said beam with respect to said certain intensity, and
   (d) means for applying a signal to said magnetic field establishing means for controlling said magnetic field establishing means.

9. Signal translating apparatus comprising
   (a) a laser element,
   (b) means for pumping said element for exciting the emission of a beam of coherent radiation therefrom,
   (c) a coil around said element configured to provide an inhomogeneous magnetic field in said element when said coil is energized, and
   (d) a source of signals and means controlled by said source of signals for energizing said coil while said laser element is excited by said pump means for intermittently interrupting said beam and providing pulses of radiation after each interruption thereof.

10. A laser device comprising
    (a) a laser element,
    (b) a pump light source in co-operative relationship with said element for illuminating said element in response to the energization of said pump light source thereby exciting the emission of coherent radiant energy from said element,
    (c) means for energizing said pump light source,
    (d) means for establishing a magnetic field within said laser element when energized, and
    (e) means for applying a pulse of current to said magnetic field establishing means,
    (f) said pump light source illuminating said pump laser element both during and after said pulse of current, said pulse of current having an amplitude to produce a magnetic field of sufficient intensity to reduce the gain of said laser element to a point below that necessary to support the emission of said coherent radiant enery therefrom.

11. A laser device comprising
    (a) a laser element,
    (b) a pump light source in co-operative relationship with said laser element for illuminating said element in response to the energization of said pump light source and for exciting the emission of coherent radiant energy from said element,
    (c) an electromagnet for establishing a magnetic field within said laser element to control the gain thereof,
    (d) a signal source,
    (e) means controlled by said signal source for applying current to said electromagnet which varies in amplitude in accordance with the signal from said source,
    (f) said pump light source illuminating said laser element while said current is supplied to said electromagnet, the greatest amplitude achieved by said current producing a magnetic field of insufficient intensity to reduce the gain of said laser element below that gain necessary for sustaining the emission of coherent radiation from said laser element.

References Cited by the Examiner

UNITED STATES PATENTS

| 2,929,922 | 3/60 | Schawlow et al. | 250—199 |
| 3,054,065 | 9/62 | Woodruff | 330—4 |
| 3,170,122 | 2/65 | Bennett | 250—199 |
| 3,171,031 | 2/65 | Yariv | 250—199 |

FOREIGN PATENTS

| 608,711 | 3/62 | Belgium. |
| 953,721 | 5/64 | Great Britain. |

DAVID G. REDINBAUGH, *Primary Examiner.*